United States Patent Office 3,450,821
Patented June 17, 1969

3,450,821
STABLE COMPOSITIONS CONTAINING EICOSATETRAYN - (5,8,11,14) - OIC-(1) ACID AND DERIVATIVES THEREOF
Jens Thuroe Carstensen, Montvale, Harold Leon Newmark, Maplewood, and John James Vance, Park Ridge, N.J., assignors to Hoffmann-La Roche Inc., Nutley, N.J., a corporation of New Jersey
No Drawing. Filed Mar. 2, 1967, Ser. No. 619,955
Int. Cl. A61k 27/00
U.S. Cl. 424—318                6 Claims

ABSTRACT OF THE DISCLOSURE

A stable therapeutic composition containing eicosatetrayn-(5,8,11,14)-oic-(1) acid or its lower alkyl esters or pharmaceutically acceptable salts thereof which will not deteriorate or decompose after long periods of standing or storage. This composition contains, in addition to eicosatetrayn-(5,8,11,14)-oic-(1) acid or its aforementioned derivatives, a material selected from the group consisting of edible oils, edible waxes or mixtures thereof.

BACKGROUND OF THE INVENTION

This invention is directed to the preparation of stable therapeutic compositions containing eicosatetrayn-(5,8,11,14)-oic-(1) acid, pharmaceutically acceptable salts, that is, salts thereof with pharmaceutically acceptable bases or lower alkyl esters thereof which will not deteriorate or decompose after long periods of standing or storage.

The use of eicosatetrayn-(5,8,11,14)-oic-(1) acid, lower alkyl esters or pharmaceutically acceptable salts thereof for treating pathological inflammatory skin disorders and for treating arteriosclerosis has been disclosed in U.S. Patent No. 3,033,884, Osbond et al., May 8, 1962. However, the use of this acid or its salts or esters has not been as widespread as desired due to the fact that this acid, its lower alkyl esters or salts thereof, when formulated into conventional formulations for humans such as in hard or soft-shell capsules, tend to decompose upon storage or handling giving off a noticeable odor. This is true since conventional formulations containing eicosatetrayn-(5,8,11,14)-oic-(1) acid or its salts or lower alkyl esters are unstable, making them non-administerable after periods of storage and handling.

SUMMARY OF THE INVENTION

In accordance with this invention, it has been found that when formulations are prepared containing eicosatetrayn-(5,8,11,14)-oic-(1) acid or its pharmaceutically acceptable salts or lower alkyl esters thereof in admixture with edible oils, fats or mixtures thereof, the composition containing this acid or its aforementioned derivatives is stable for long periods of time. Hence, these compositions can be stored for long periods of time without danger of deterioration or decomposition. Furthermore, by means of the increased stability of the composition of this invention, large dosages of this acid or its derivatives, such as 1 gram per capsule, can be formulated without danger of decomposition or deterioration, even after long periods of storage.

In accordance with this invention, the composition can contain from about 30% to about 45% by weight, based upon the total weight of the composition of eicosatetrayn-(5,8,11,14)-oic-(1) acid or its pharmaceutically acceptable salts or lower alkyl esters, and from about 55% by weight to about 70% by weight of the composition of an edible wax, edible fat or mixtures thereof. While amounts of the acid or its derivatives lower than 30% with amounts of the fat or oil component higher than 70% can be utilized in accordance with this invention, it is seldom desirable to utilize compositions containing such small amounts of eicosatetrayn-(5,8,11,14)-oic-(1) acid or its aforementioned derivatives due to the necessity of frequent administration in order to obtain a required therapeutic dosage.

DETAILED DESCRIPTION OF THE INVENTION

In accordance with this invention, the free acid or any of the conventional organic or inorganic pharmaceutically acceptable salts of eicosatetrayn-(5,8,11,14)-oic-(1) acid can be utilized in the composition of this invention. These salts include the alkali metal salts such as the sodium and potassium salts, ammonium salts and alkaline earth metal salts such as the calcium salts. Any of the conventionally pharmaceutically acceptable organic salts of eicosatetrayn-(5,8,11,14)-oic-(1) acid such as the organic amine salts can be utilized in accordance with this invention. Typical organic amines which form salts of the eicosatetrayn-(5,8,11,14)-oic-(1) acid, which can be utilized in accordance with this invention, include ethyl amine, diethyl amine, triethyl amine, ethylenediamine, mono, di and triethanol amines, ethyl diethanol amine, and butyl-monoethanol amine, p-tertiaryamylphenyl diethanol amine, galactamine and n-methyl glucamine, glucosamine, guanidine, etc.

Any of the lower alkyl esters containing from 1 to 7 carbon atoms of eicosatetrayn-(5-8,11,14)-oic-(1) acid can be utilized in the composition of this invention. Typical esters of eicosatetrayn-(5,8,11,14)-oic-(1) acid include the methyl, ethyl, butyl and isopropyl esters thereof.

Generally, the composition of this invention is prepared by admixing the eicosatetrayn-(5,8,11,14)-oic-(1) acid or its aforementioned derivatives in a material which can be either an edible oil, edible fat or mixture thereof. Generally, for formulation purposes, it has been found that it is best to include a mixture of an edible wax and an edible oil in the formulation. In this manner, the viscosity of the formulation containing the eicosatetrayn-(5,8,11,14)-oic-(1) acid can be adjusted to a desired value. However, the aforementioned beneficial results of this invention can be obtained by utilizing either an edible oil or an edible fat along with the eicosatetrayn-(5,8,11,14)-oic-(1) acid or its aforementioned derivatives. Any edible oil can be utilized in the composition in accordance with this invention. The preferred oils are the mono, di or triglycerides of saturated or unsaturated fatty acids containing from about 6 to 24 carbon atoms. Typical oils which can be utilized in accordance with this invention include edible vegetable oils such as coconut oil, sesame oil, peanut oil, corn oil, cotton seed oil, soybean oil, etc., or modified fractions of these oils. Of the vegetable oils, coconut oil is preferred. Other edible oils which may be used in accordance with this invention are lard and butter oil.

Any edible wax can be utilized in the composition of this invention to produce the aforementioned beneficial results. Among the edible waxes which can be utilized are included beeswax, cetyl alcohol, montan wax, Japan wax, etc. Edible anti-oxidents, such as the lipid soluble anti-oxidants which include butylated hydroxy toluene, butylated hydroxy anisole, isopropyl citrate, propyl gallate, tocopherols, ascorbyl palmitate, nordihydroguaiaretic acid, etc., may be added to the composition of this invention to further enhance the stability against deterioration by heat, air, and moisture.

In producing the composition in accordance with this invention, the eicosatetrayn-(5,8,11,14)-oic-(1) acid and its aforementioned derivatives are mixed with either the edible oil, edible wax or mixtures thereof to form a solution or dispersion therein. Whether the composition of this invention is in the form of a solution or dispersion will depend upon the concentration of the acid or its derivatives utilized therein.

For pharmaceutical applications, the composition of this invention can be used as is or it can be formulated into solutions or suspensions using medicinally acceptable liquid vehicles for oral administration. Additionally, the composition of this invention can be formulated into suitable oral dosage forms, such as hard-shell capsules, or soft-shell capsules. In the production of capsules containing the composition of this invention, any of the adjuvant materials, ordinarily used in formulating such products can be used. These can include, for example, fillers such as coprecipitated aluminum hydroxide-calcium carbonate, dicalcium phosphate or lactose; disintegrating agents such as maize, starch; and lubricating agents such as talc, calcium stearate, etc.

In preparing the composition of this invention, for pharmaceutical applications, it is preferred to encapsulate the composition of this invention in a gelatin matrix. This can be accomplished by either dispersing the composition of this invention in gelatin or by coating the composition of this invention with gelatin, or by utilizing the gelatin as a film which covers the composition of this invention.

In general, in treating the patient, eicosatetrayn-(5,8,11,14)-oic-(1) acid or its esters or pharmaceutically acceptable salts can be utilized in dosages of from 0.1 gram per day to 5 grams per day, depending upon the needs and requirements of the patient, as diagnosed by the attending physician. The foregoing, notwithstanding the dosages mentioned herein, are exemplary only and they are not intended to limit the scope or practice of this invention. It will be readily apparent that, in certain instances, the administration of quantities of eicosatetrayn-(5,8,11,14)-oic-(1) acid or its salts or esters thereof, substantially less than 0.1 gram per day may be desirable, whereas in other instances, the administration of quantities of eicosatetrayn-(5,8,11,14)-oic-(1) acid or its esters or salts in excess of 5.0 grams may be indicated.

The invention is further disclosed by the following example, which is illustrative but not limitative thereof.

Example

A soft-shell capsule was formulated from the following ingredients.

| Ingredients: | Amount, mg./capsule |
|---|---|
| Eicosatetrayn - (5,8,11,14) - oic - (1) acid (powder) | 262.500 |
| Neobee O [1] | 451.500 |
| Wax mixture [2] | 10.000 |
| Lecithin, soy | 15.000 |

[1] A triglyceride ester of fatty acids, said ester having an iodine value of less than 10, an acid value of less than 0.1, a saponification value of about 300 and a specific gravity of from 0.935 to 0.940.
[2] The wax mixture consisting of 1 part by weight of hydrogenated soybean oil, 1 part by weight Yellow Wax (beeswax) and 4 parts by weight vegetable shortening.

The soft-shell capsules were manufactured as follows:

The wax mixture was melted and slowly added to the Neobee O under constant stirring. After the melted wax mixture was added, the lecithin-soy was added to the mixture under constant stirring.

After all of the lecithin-soy was added eicosatetrayn-(5,8,11,14)-oic-(1) acid in powder form was added to the mix while stirring continuously with a high-speed stirrer. Mixing was continued until a uniform mixture was obtained. This mixture was then homogenized and deaerated to obtain a suspension. This suspension was injected into the shell of a soft-shell gelatin capsule by means of a soft-shell capsule filling machine so as to form the capsule.

We claim:
1. A stable therapeutic composition comprising from about 30 to about 45 percent by weight of an active compound selected from the group consisting of eicosatetrayn-(5,8,11,14)-oic-(1) acid, salts thereof with pharmaceutically acceptable bases and lower alkyl esters thereof, and from about 55 to about 70 percent by weight of a stabilizing material selected from the group consisting of edible oils, edible waxes and mixtures thereof.
2. The stable therapeutic composition of claim 1 wherein said composition additionally contains an edible lipid-soluble anti-oxidant.
3. The stable therapeutic composition of claim 1 wherein said edible oil is selected from the group consisting of mono-, di- or triglyceride esters of saturated or unsaturated fatty acids containing from 6 to 24 carbon atoms.
4. The stable therapeutic composition of claim 1 wherein said active compound is eicosatetrayn-(5,8,11,14)-oic-(1) acid.
5. The stable therapeutic composition of claim 1 wherein said active compound is eicosatetrayn-(5,8,11,14)-oic-(1) acid and said stabilizing material is an edible vegetable oil selected from the group consisting of coconut oil, sesame oil, peanut oil, corn oil, cottonseed oil, soybean oil, fractions thereof and mixtures thereof.
6. The stable therapeutic composition of claim 5 wherein said edible vegetable oil is replaced in whole or in part with an edible wax selected from the group consisting of beeswax, cetyl alcohol, montan wax and Japan wax.

References Cited

UNITED STATES PATENTS 3,033,884   5/1962   Osbond et al. _____ 260—413

OTHER REFERENCES

Nash: Am. J. Pharm., 130 (1958), pp. 152–164.
Ostendorf: J. Soc. Cosmetic Chemists, 16, No. 4, pp. 203–217 (1965).

LEON ZITVER, *Primary Examiner.*

HOWARD T. MARS, *Assistant Examiner.*

U.S. Cl. X.R.

260—413; 424—312